United States Patent [19]

Rosenblum

[11] 4,021,263

[45] May 3, 1977

[54] POLISHING COMPOSITIONS

[75] Inventor: Marc Rosenblum, Milltown, N.J.

[73] Assignee: Johnson & Johnson, New Brunswick, N.J.

[22] Filed: Feb. 27, 1975

[21] Appl. No.: 553,704

Related U.S. Application Data

[63] Continuation-in-part of Ser. No. 214,719, Jan. 3, 1972, abandoned.

[52] U.S. Cl. .............................. 106/288 B; 51/307; 51/309 A
[51] Int. Cl.² ......................................... C09G 1/02
[58] Field of Search ................... 106/288 B, 308 B; 51/307, 309; 423/446

[56] References Cited

UNITED STATES PATENTS

| | | | |
|---|---|---|---|
| 2,471,132 | 5/1949 | Wickman | 51/309 |
| 3,060,098 | 10/1962 | Gershon | 51/309 |
| 3,385,684 | 5/1968 | Voter | 51/295 |

*Primary Examiner*—Winston A. Douglas
*Assistant Examiner*—J. V. Howard
*Attorney, Agent, or Firm*—Geoffrey G. Dellenbaugh

[57] ABSTRACT

Polishing compositions for highly filled resin-bonded dental restorations comprising a dispersion of alumina having a particle size less than about 3.0 microns and for nonprecious metal used in dental construction comprising a dispersion of said alumina and diamond having a particle size at least equal to that of the alumina but less than about 3.0 microns.

4 Claims, No Drawings

POLISHING COMPOSITIONS

REFERENCE TO RELATED APPLICATION

This application is a continuation-in-part of my co-pending application, Ser. No. 214,719 filed Jan. 3, 1972, now abandoned.

BACKGROUND OF THE INVENTION

The present invention pertains to polishing compositions, and more particularly to polishing compositions for highly-filled resin-bonded dental restorations and nonprecious metal used in dental construction.

Materials used in dental restorations and dental construction must be polished in order to be acceptable to the dentist and the patient. Polished materials have a finished appearance and a smooth, natural feel in the mouth. Moreover, polished materials collect plaque less readily than unpolished materials and hence need cleaning less often. For these reasons it is desirable that materials used in dental restoration be polished. This polishing is generally accomplished in three steps, using successively finer abrading agents. The compositions of the invention are designed for use in the final polishing step, after the surface has been roughly finished and then prepared for polishing. The rough finishing may be accomplished with a number of commonly-available abrasive silicon carbide greenstones or carbide burrs as is well-known in the dental art. The second step, the finishing preparatory to polishing, may be accomplished with a number of commonly-available abrasive fine aluminum oxide whitestones and fine rubber-bound abrasive tools (e.g. a Dedco Tan Midget) as is well-known in the dental art.

Both highly-filled resin-bonded dental restorations and nonprecious metal dental constructions comprise a harder phase and a softer phase. In the former material, the quartz or other filler is much harder than the resin bonding agent; in the latter material, as disclosed for example in United States patent application Ser. No. 376,767, filed July 5, 1973, the nickel boride-chromium silicide included phase is harder than the surrounding nickel chromium matrix. Using prior art polishing compositions generally results in a more rapid abrading of the softer phase than of the harder phase to produce a "stepped" effect. That is, the resin is gouged out from between the quartz particle or the matrix is worn away more rapidly than the included phase. The resulting uneven surface is not polished. In order to have effective polishing there must be substantially equal abrasion of both phases of the material so that a smooth, even surface is produced.

Further, it is necessary to have efficient polishing, so that a dental technician or dentist can rapidly polish a nonprecious metal dental construction or a highly-filled resin-bonded dental restoration. Certain prior art pastes for polishing the former have been relatively effective polishing agents without being satisfactorally efficient. These pastes are unsatisfactory when compared with the pastes of the invention. It is also clear that the use of two or more pastes in the final polishing step is highly unsatisfactory because of the excessive amount of time necessary to polish using them.

The disadvantages of the prior art polishing compositions are obviated by the compositions of the present invention.

SUMMARY OF THE INVENTION

The present invention provides a polishing composition capable of effectively and efficiently polishing highly-filled resin-bonded dental restorations, which composition comprises a dispersion of finely divided alumina in an inert and biologically safe solvent. The present invention further provides a polishing composition capable of effectively and efficiently polishing nonprecious metal dental constructions which composition comprises a dispersion of finely divided alumina and finely divided diamond in an inert and biologically safe solvent.

The compositions of the invention are superior to those of the prior art because they efficiently provide a smooth, polished, non-stepped surface on the dental restoration or dental constructions, in contrast to that provided by polishing compositions of the prior art.

DETAILED DESCRIPTION OF THE INVENTION

First consider the composition for polishing highly-filled resin-bonded dental restorations. In this composition, the alumina should have a particle size of less than about 3.0 microns, preferably from about 0.05 microns to about 2.0 microns, and more preferably from about 0.3 microns to about 1.0 microns; and should be present in a concentration from about 5% to about 50% by weight, preferably from about 20% to about 40% and more preferably from about 25% to about 35% by weight of the weight of the dispersion. The remainder of the composition comprises essentially the inert and biologically safe carrier such as, for example, water, glycerol, sorbitol, polyethylene glycol, and the like. This composition may have a viscosity from about 600 cps to about 40,000 cps, but preferably from about 1200 cps to about 40,000 cps, and more preferably from about 3000 cps to about 10,000 cps. It is considered to be within the scope of the present invention to add dye, flavoring, preservative, or the like to the polishing composition. A suspension agent may also be added to prevent settling of the alumina during storage of the paste. Such a suspension agent may be, for example, submicron silica or the like inert and biologically safe hydrophobic colloid. A preferred submicron silica is that sold by Degussa Company under the trade name Aerosil R-972. The composition containing submicron silica has a viscosity of from about 1 million cps to about 3 million cps. Using this composition of the invention, highly-filled resin-bonded dental restorations can be effectively and efficiently polished.

Next consider the composition for polishing nonprecious metal dental constructions. In this composition, the diamond should have a particle size less than about 3.0 microns, preferably from about 0.05 microns to about 1.0 microns, and more preferably about 0.25 microns. The alumina should have a particle size less than about 3.0 microns, preferably from about 0.05 microns to about 1.0 microns, and more preferably about 0.05 microns; provided that the particle size of the diamond should be at least equal to that of the alumina. The diamond should be present in a concentration of from about 0.25% to about 25.0% by weight, preferably from about 0.25% to about 5.0% by weight, and more preferably about 0.50% by weight of the weight of the composition. The alumina should be present in a concentration of from about 15% to about 50% by weight, preferably from about 20% to about 40% by weight, and more preferably about 40% by weight of the weight of the composition. The remainder of the composition comprises essentially an inert and biologically safe carrier such as, for example, water, glycerol, sorbitol, polyethylene glycol, silicone grease, petrolatum, and the like. It is considered to be within the scope of the present invention to add coloring, perfume, preservatives, or the like to the polishing composition. Using this composition of the invention, nonprecious metal dental constructions can be effectively and efficiently polished.

While it is recognized that the polishing achieved by the diamond and alumina composition of the present invention could also be achieved by polishing the nonprecious metal dental constructions either with diamond alone or first with alumina and then with diamond, this procedure would not yield the rapid and effective polishing achieved by the composition of the invention. Using a polishing paste containing only diamond results in less efficient polishing, which is more time-consuming than the use of the composition of the invention and hence undesirable. Using two separate polishing pastes for the final polishing step is even more wasteful of time and hence even more undesirable. Only by using the diamond and alumina polishing composition of the present invention can a dental technician polish nonprecious metal dental construction in an effective and efficient fashion.

The preferred tool for polishing a highly-filled resin-bonded dental restoration or a nonprecious metal dental construction with the compositions of the invention is one of felt, as for example a felt wheel or a felt tip.

The compositions of the invention are illustrated by the following examples, which are intended only for purposes of illustration and not to limit the scope thereof. All parts are by weight unless otherwise specified.

EXAMPLE I

A polishing composition is prepared comprising the following:

| | |
|---|---|
| 1.0 micron alumina | 19.0 parts |
| 0.3 micron alumina | 4.0 parts |
| 0.05 micron alumina | 2.0 parts |
| glycerol | 75.0 parts |
| Total | 100.0 parts |

These ingredients are mixed in a ball-mill for one half hour and then are tested. This composition effectively and efficiently polishes a highly-filled resin-bonded dental restoration.

EXAMPLE II

A polishing composition is prepared which comprises the following:

| | |
|---|---|
| 0.05 micron alumina | 39.5 grams |
| 0.25 micron diamond | 0.5 grams |
| polyethylene glycol 400 | 60.0 grams |
| Total | 100.0 grams |

The components of the composition are thoroughly mixed and the composition is tested. This combination efficiently and effectively polishes a nonprecious metal dental construction.

EXAMPLE III

Following the procedure of Example I, polishing compositions are prepared which comprise:

| | | |
|---|---|---|
| a) | 1.0 micron alumina | 25 parts |
| | glycerol | 75 parts |
| b) | 1.0 micron alumina | 50 parts |
| | glycerol | 50 parts |
| c) | 3.0 micron alumina | 5 parts |
| | glycerol | 95 parts |
| d) | 0.3 micron alumina | 15 parts |
| | water | 85 parts |
| e) | 2.0 micron alumina | 10 parts |
| | sorbitol | 90 parts |
| f) | 1.0 micron alumina | 30 parts |
| | glycerol | 67 parts |
| | submicron silica | 3 parts |

These compositions all effectively and efficiently polish highly-filled resin-bonded dental restorations.

EXAMPLE IV

Following the procedure of Example II, polishing compositions are prepared comprising:

| | | |
|---|---|---|
| a) | 1.0 micron alumina | 39 parts |
| | 1.0 micron diamond | 1 part |
| | polyethylene glycol 400 | 60 parts |
| b) | 0.5 micron alumina | 15 parts |
| | 1.0 micron diamond | 0.5 parts |
| | petrolatum | 84.5 parts |
| c) | 0.05 micron alumina | 50 parts |
| | 0.25 micron diamond | 1 part |
| | polyethylene glycol 400 | 49 parts |

These compositions all effectively and efficiently polish nonprecious metal dental constructions.

What is claimed is:

1. A polishing composition consisting essentially of:
   a. from about 15% to about 50% of the weight of the composition alumina, said alumina having a particle size of less than about 3.0 microns;
   b. from about 0.25% to about 25.0% by weight of the weight of the composition diamond, said diamond having a particle size less than about 3.0 microns but at least equal to that of the alumina; and
   c. an inert, biologically safe, flowable carrier.

2. A composition as in claim 1 wherein the particle size of said alumina is from about 0.05 microns to about 1.0 microns and which comprises about 0.50% by weight diamond, said diamond having a particle size from about 0.05 microns to about 1.0 microns but said particle size being at least equal to that of said alumina.

3. A composition as in claim 2 wherein the particle size of said diamond is about 0.25 microns and wherein the particle size of said alumina is about 0.05 microns.

4. The composition of claim 1 wherein the inert, biologically safe, flowable carrier is a member selected from the group consisting of water, glycerol, sorbitol, polyethylene glycol, silicone grease, and petrolatum.

* * * * *